United States Patent

[11] 3,587,603

| [72] | Inventor | Ronald G. Bailey |
| --- | --- | --- |
| | | St. Paul, Minn. |
| [21] | Appl. No. | 595,306 |
| [22] | Filed | Nov. 14, 1966 |
| [45] | Patented | June 28, 1971 |
| [73] | Assignee | Honeywell Inc. |
| | | Minneapolis, Minn. |

[54] FLUIDIC SENSOR
1 Claim, 2 Drawing Figs.

[52] U.S. Cl................................................... 137/81.5,
73/339, 73/357
[51] Int. Cl...................................................... F15c 1/08,
G01k 11/26
[50] Field of Search.............................................73/357, 339
(A); 137/81.5

[56] References Cited
UNITED STATES PATENTS

| 3,314,294 | 4/1967 | Colston | 73/357 |
| --- | --- | --- | --- |
| 3,158,166 | 11/1964 | Warren | 137/81.5 |
| 3,185,166 | 5/1965 | Horton et al. | 137/81.5 |

*Primary Examiner*—Verlin R. Pendegrass
*Attorneys*—Roger W. Jensen and Charles J. Ungemach ABSTRACT: A fluidic temperature sensor which produces an oscillating signal having a frequency indicative of the temperature of the fluid flowing therethrough and wherein the output flow is parallel to the input flow. The sensor comprises a chamber having a splitter therewithin, an inlet for directing fluid against the splitter, and an outlet parallel to the inlet for allowing flow from the chamber. A signal pickoff may also be provided in the outlet.

PATENTED JUN28 1971    3,587,603

INVENTOR.
RONALD G. BAILEY
BY Charles J. Ungemach
ATTORNEY

FLUIDIC SENSOR

The invention described herein was made in the performance of work under a NASA contract and is subject to the provisions of section 305 of the National Aeronautics and Space Act of 1958, Public Law 85—568 (72 Stat. 435; 42 U.S.C. 2457).

This invention relates to a sensing apparatus and more specifically to a fluidic temperature sensitive oscillator that has advantages which make it desireable for wind tunnel use.

There are fluidic devices in the prior art which function as temperature sensors, such as the fluid oscillator shown in the Warren, U.S. Pat. No. 3,158,166. However, oscillators of this type are unacceptable for most uses as temperature sensors since the response time of the oscillator is very slow. A fluidic temperature sensor having a faster time response is shown in the patent application filed in the name of Edward G. Zoerb, Ser. No. 469,972 filed June 30, 1965 and assigned to the same assignee as the present invention.

In special applications, such as temperature measurement in wind tunnels and the like it is desirable to have a fluid temperature sensor that measures the temperature of the fluid and causes a minimum of disturbance to the fluid flowing past the temperature sensor. To measure the temperature of a fluid stream it is often desirable to place the temperature sensor within the fluid stream and let the fluid stream supply the power nozzle flow to the temperature sensor. However, by placing the temperature sensor in the fluid stream, disturbances are caused in the fluid stream. In order to minimize these disturbances around the temperature sensor the fluid entering the temperature sensor should exhaust in a single stream in the same direction as it entered. The oscillator shown in the Warren patent requires that the fluid exhaust at an angle to its entrance direction. Furthermore, the response time of a device such as Warren's is very slow because of the length of time required to purge the oscillator passages and chambers of the old fluid.

If the fast time response temperature sensor of Zoerb were to be used to measure the temperature of a fluid stream by placing the temperature sensor within the fluid stream, it would be necessary to have the fluid exhausting at some angle into the approaching fluid stream or have additional ducting for directing the fluid rearward. Obviously, this would cause disturbances in the fluid stream or make for a bulkier unit. In certain applications, it is desirable to have a fluid temperature sensor that has fast time response as well as one that causes a minimum amount of disturbance in the fluid stream. I have invented just such a temperature sensor.

I have also discovered that my temperature sensitive oscillator exhibits a thermally isolating effect between the temperature of the housing and the fluid therein. That is, the heat transfer between the fluid stream and the housing has very little effect on the output signal as opposed to certain prior art devices where the temperature of the housing influences the output signal. It is not completely understood why this isolating effect occurs but it is believed due to the flow pattern set up within my sensor housing because of the offset exhaust passage.

Briefly, the present invention is a temperature sensitive fluid oscillator in which is provided an inlet for introducing a fluid into a pair of shaped chambers, an outlet located in the same direction as the inlet, but offset from the inlet so that when a fluid is introduced into the chambers the fluid must completely swirl around the shaped chambers to exhaust through the exhaust passage.

The function of my invention will become apparent from the following description along with the drawing, in which.

Figure 1:
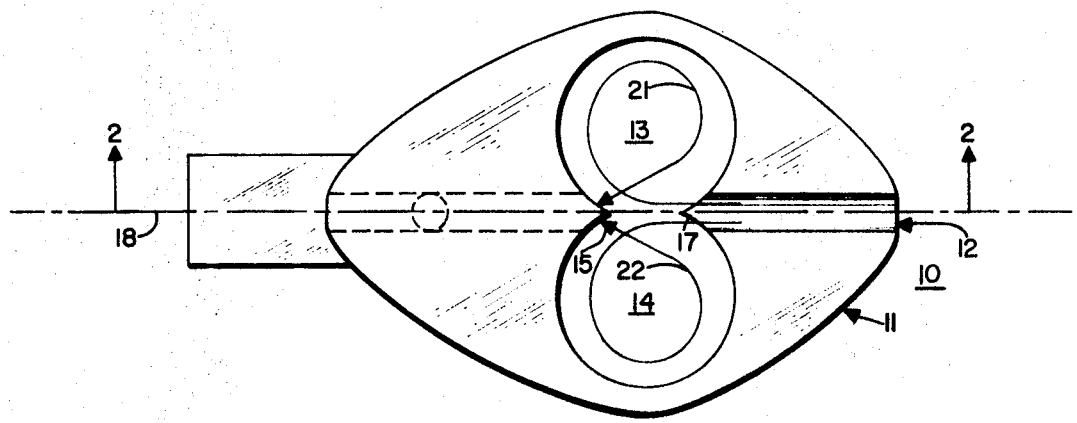
FIG. 1 is a top view of my temperature sensor with the top plate removed.

Referring now to FIG. 1, reference numeral 10 generally depicts my pure fluid temperature sensor. Fluid temperature sensor 10 comprises a plate 11 having an inlet nozzle 12 located in line with an axis 18, a first shaped chamber 13 and a second shaped chamber 14 having a splitter or flow divider element 15 therebetween. Located below fluid inlet nozzle 12 is a second splitter 17 which guides the fluid in the chambers 13 and 14 into an exhaust passage 20 shown hidden. Arrows 21 and 22 are shown to indicate the direction of travel of oncoming fluid as it enters and exhausts from the chambers 13 and 14.

Figure 2:
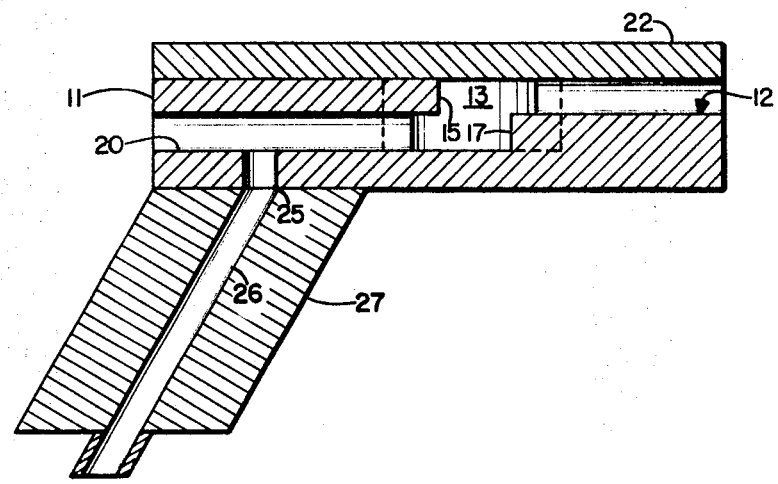
FIG. 2 is a cross-sectional view of the sensor shown in FIG. 1 taken along line 2—2 of FIG. 1.

Referring now to FIG. 2, my temperature sensor 10 is shown with a top plate 22 thereon. Inlet nozzle 12, chamber 13 and exhaust passage 20 within housing 11 also appear in this FIG. It will be noted that the fluid inlet nozzle 12 directs a stream of oncoming fluid at the splitter 15 which is located immediately above the exhaust passage 20.

Located in the exhaust passage 20 is a pressure tap 25, which connects to the pressure conduit 26 in support member 27. It is not necessary that pressure tap 25 be located in the exhaust passage as shown. For example, a pressure tap could be located in chambers 13 or 14; however, for certain wind tunnel applications it is desirable to have the pressure tap located in the position shown.

In the operation of my fluidic temperature sensor 10, a portion of fluid from a fluid stream enters the fluid inlet nozzle 12. Therefrom the fluid flows and impinges on splitter 15 causing oscillation of the fluid stream about splitter 15 (the oscillation of a fluid stream about a splitter is more fully discussed in the aforementioned Zoerb application).

The fluid flowing in chambers 13 and 14 must circulate 36° as it flows through the temperature sensor 10 since the exhaust passage 20 is directly in line but is offset from the inlet nozzle 12. That is, the momentum of the fluid as it enters through the fluid nozzle 12 causes the fluid to flow as indicated by the arrows 21 and 22. The forced circulation of fluid through the chambers 13 and 14 insures that old fluid is purged from the chambers and new fluid is continually supplied to chambers 13 and 14 so that the time response of the temperature sensor is quite rapid.

The frequency of oscillation of the fluid stream about splitter 15 is dependent upon the temperature of the fluid within the chambers 13 and 14. Since new fluid is being continually supplied from fluid supply nozzle 12 and the old fluid is being continually exhausted through exhaust passage 20, the time required to obtain an oscillating fluid output signal indicative of the temperature of the new fluid supplied to the inlet nozzle 12 will only depend upon the fluid flow rate through the temperature sensor 10.

By placing the exhaust passage 20 offset from the inlet nozzle 12 it is thus possible to have a fluid temperature sensitive oscillator and still attain the fast purging action of the chambers 13 and 14 because the fluid does not stagnate but flows in one continuous path around the internal geometry of temperature sensor and out the exhaust passage 20.

To determine the temperature of the fluid within the temperature sensor 10 the number of pressure pulses propagating through passage 26 per unit time are counted.

The speed of the pressure pulses within chamber 13 and 14 is, for a particular type of fluid, a function of the gas constant of the fluid, the ratio of the specific heats of the fluid, and the temperature of the fluid according to the equation $C = \sqrt{\gamma RT}$
where $C$ = the speed of sound $\gamma$ = ratio of the specific heats of the fluid $R$ = gas constant of the fluid $T$ = temperature of the fluid The frequency of oscillation (f) of the fluid stream about splitter 15 is a function of the speed of sound of the fluid. It can readily be seen that, for a given fluid, changes in the temperature of the fluid cause changes in the frequency of oscillation of the fluid stream about splitter 15 according to the equation $f = C/\lambda$ where $\lambda$ = a characteristic of the temperature sensor geometry. It is this change in the frequency of oscillation of the fluid stream which is measured by counting the number of pulses propagating through passage 26 per unit time that is used as an indication of the change in the temperature of the fluid. Obviously, changes in composition of the fluid will also result in changes in the frequency of oscillation.

While I have shown and described a specific embodiment of this invention, further modifications and improvements will occur to those skilled in the art.

I claim:

1. Fluid responsive apparatus of the fluid oscillator type comprising:

housing means enclosing a substantially planar chamber, said chamber having at least two portions;

a supply nozzle in communication with said chamber, sand supply nozzle defining an axis lying in a plane parallel to said planar chamber;

a splitter element positioned in said chamber, said splitter element being spaced from said supply nozzle and substantially aligned with said axis; and an exhaust passage located in said housing means in communication with said chamber, said exhaust passage having an axis substantially parallel to the axis of said supply nozzle, but offset therefrom in a direction perpendicular to said plane, fluid from said supply nozzle being alternately supplied to first one and then the other portion of said chamber.